United States Patent
Somani et al.

(10) Patent No.: US 10,581,266 B2
(45) Date of Patent: Mar. 3, 2020

(54) ENERGY STORAGE SYSTEM AND METHOD FOR DIRECT COUPLING ENERGY STORAGE AND POWER SOURCE

(71) Applicant: DYNAPOWER COMPANY LLC, South Burlington, VT (US)

(72) Inventors: Apurva Somani, South Burlington, VT (US); Xiaorong Xia, South Burlington, VT (US); Gysler Castelino, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 15/959,825

(22) Filed: Apr. 23, 2018

(65) Prior Publication Data

US 2019/0319473 A1 Oct. 17, 2019

Related U.S. Application Data

(60) Provisional application No. 62/658,498, filed on Apr. 16, 2018.

(51) Int. Cl.
*H02J 7/35* (2006.01)
*H02J 7/00* (2006.01)
*H02J 3/38* (2006.01)

(52) U.S. Cl.
CPC ............ *H02J 7/35* (2013.01); *H02J 3/385* (2013.01); *H02J 7/0068* (2013.01)

(58) Field of Classification Search
CPC ...................... H02J 7/35; H02J 3/382–387
See application file for complete search history.

(56) References Cited

U.S. PATENT DOCUMENTS

| | | | | |
|---|---|---|---|---|
| 2003/0047209 A1* | 3/2003 | Yanai | .................. | H02J 3/32 |
| | | | | 136/244 |
| 2009/0302681 A1* | 12/2009 | Yamada | ................... | H02J 7/35 |
| | | | | 307/46 |
| 2012/0047386 A1* | 2/2012 | Matsui | ............... | H01M 10/465 |
| | | | | 713/340 |
| 2012/0212062 A1* | 8/2012 | Yamada | ............... | H02J 7/0019 |
| | | | | 307/80 |
| 2012/0261999 A1* | 10/2012 | Parkhideh | ................. | H02J 3/38 |
| | | | | 307/80 |
| 2014/0091628 A1* | 4/2014 | Thompson | ............... | H02J 7/35 |
| | | | | 307/66 |

(Continued)

*Primary Examiner* — Rexford N Barnie
*Assistant Examiner* — David A Shiao

(57) ABSTRACT

An energy storage system for direct DC coupling includes a power source electrically connected to a first node, a power converter coupled to the first node, an energy storage unit coupled to the first node through direct DC coupling, and a control system. The power converter controls the output voltage of the power source under the control of the control system. The energy storage unit draws energy from the power source or the bus when charging and supplies energy to the bus when discharging. A main switch is coupled between the first node and the energy storage unit. The control system is configure to control the power converter to adjust the output voltage to the energy storage unit voltage, control the main switch to electrically connect the energy storage unit to the first node, and control the main switch to electrically disconnect the energy storage unit from the first node.

27 Claims, 10 Drawing Sheets

(56) References Cited

U.S. PATENT DOCUMENTS

2015/0200559 A1\* 7/2015 Im ........................ H02J 7/0022
                                                      307/18
2017/0063147 A1\* 3/2017 Nakayama ................ H02J 3/32
2017/0229872 A1\* 8/2017 Ghotra .................. H02J 7/0068
2018/0076629 A1   3/2018 McMorrow et al.
2019/0052090 A1\* 2/2019 Kobayashi ................ H02J 3/38

\* cited by examiner

Energy storage unit is discharging or
Power supply is outputting zero power (or close)

710: Control power converter power to reduce discharge power of energy storage unit to 0

↓

720: Control main switch to open

↓

730: Control power converter to operate in MPPT mode

FIG. 7A

Energy Storage unit is charging

712: Control power converter power to reduce discharge power of storage unit

↓

722: Electrically connect break path to node A

↓

732: Control Main Switch to Open

↓

742: Electrically Disconnect break path

↓

752: Control converter to operate in MPPT mode

FIG. 7B

Energy storage unit is discharging or
Power supply is outputting zero power (or close)

> 910: Control power converter power to reduce discharge power of storage unit to 0

> 920: Control main switch to open

> 930: Control power converter to operate in MPPT mode

FIG. 9A

Energy Storage unit is charging

> 912: Control power converter to reduce charge power into storage unit to 0

> 922: Control Main Switch to Open

> 932: Control power converter to operate in MPPT mode

FIG. 9B

Energy storage unit is discharging or
Power supply is outputting zero power (or close)

1110: Control power converter power to reduce discharge power of energy storage unit to 0

↓

1120: Control main switch to open

↓

1130: Control power converter to operate in MPPT mode

FIG. 11A

Energy Storage unit is charging

1112: Control power converter power to reduce charge power into energy storage unit

↓

1122: Control main switch T2 to open

↓

1132: Electrically connect break path to node A

↓

1142: Control main switch T1 to open

↓

1152: Electrically Disconnect break path and control converter to operate in MPPT mode

FIG. 11B

ENERGY STORAGE SYSTEM AND METHOD FOR DIRECT COUPLING ENERGY STORAGE AND POWER SOURCE

BACKGROUND OF THE INVENTION

The present invention relates generally to energy storage systems, and more specifically, to an energy storage system and method for direct coupling an energy storage unit and a power source.

Electric power conversion devices and associated control systems may be used to interface various energy resources. For example, a power system may include a variety of interconnected distributed energy resources (e.g., power generators and energy storage units) and loads. The power system may be referred to as a microgrid system, and may connect to a utility grid or another microgrid system. The power system employs the electric power conversion to convert power between these energy resources (e.g., AC/DC, DC/DC, AC/AC and DC/AC).

Power systems may be designed to supply power, regulate power and transfer power from one source to another with the goal of providing power to a load. It is desirable to provide power in the most efficient manner possible to maximize energy generation at the lowest cost. However, topology limitations and design requirements can be limitations on energy generation and the amount of power that is ultimately available for use.

An energy storage system is a power system in which at least one of the energy resources is an energy storage unit (e.g., battery energy storage or flywheel energy storage). Often, in the energy storage system, the energy storage unit stores energy from a renewable energy source, such as solar panels or wind. However, energy from a grid, such as a utility grid or another microgrid, is often available for storage in energy storage units.

When the power source of an energy storage system is a renewable source such as wind energy or solar energy, multiple power converters can be employed to supply energy to loads in an efficient manner. The power converters may include power inverters to convert the power supplied by the renewable source to alternating current (AC) for supplying the power to, e.g., an AC grid and/or AC loads, and DC/DC converters to convert the power supplied by the renewable source to, e.g., DC loads and/or energy storage units such as batteries or flywheels. Although these power converters can be utilized in a manner that allows for efficient transmission of power, the power converters themselves can be expensive, require expertise and time to implement in the field, and require a certain amount of space to implement.

BRIEF SUMMARY OF THE INVENTION

Embodiments of the present invention include an energy storage system in which an energy storage unit is direct DC coupled to a power source and methods for connecting and disconnecting the direct DC coupled energy storage unit to/from the power source.

An energy storage system for direct DC coupling according to one aspect of the invention includes a power source electrically connected to a first node, a power converter coupled to the first node, an energy storage unit coupled to the first node through direct DC coupling, a main switch for electrically connecting and disconnecting the energy storage unit from the first node, and a control system for controlling the electrical connection and electrical disconnection of the energy storage unit from the first node. The power converter has a first port coupled to the first node and a second port coupled to a bus, and the power converter controls the output voltage of the power source under the control of the control system. The energy storage unit draws energy from the power source or the bus when charging and supplies energy to the bus when discharging. The main switch is coupled between the first node and the energy storage unit. The control system is configure to control the power converter to adjust the magnitude of the output voltage to a magnitude of the energy storage unit voltage, control the main switch to electrically connect the energy storage unit to the first node, and control the main switch to electrically disconnect the energy storage unit from the first node.

The energy storage system may also include a break path coupled to the first node for diverting power away from the first node when the energy storage unit is being electrically connected to the first node.

The control system being configured to control the power converter to adjust the magnitude of the output voltage to a magnitude of the energy storage unit voltage and control the main switch to electrically connect the energy storage unit to the first node may include the control system being configured to: electrically connect the break path to the first node; control the power converter to adjust the magnitude of the output voltage at the first node to a magnitude of the energy storage unit voltage; and once the magnitude of the output voltage at the first node is adjusted to the magnitude of the energy storage unit voltage, electrically connect the energy storage unit to the first node and electrically disconnect the break path from the first node.

The control system being configured to electrically disconnect the battery from the first node may include the control system being configured to: when the energy storage unit is discharging: control the power converter to reduce a discharge power of the energy storage unit, control the main switch to open to electrically disconnect the energy storage unit from the first node; and control the power converter to operate in maximum power point tracking (MPPT) mode; and when the energy storage unit is charging: control the power converter to reduce a charge power of the energy storage unit; control the main switch to open to electrically disconnect the energy storage unit from the first node; and control the power converter to operate in maximum power point tracking (MPPT) mode.

The control system being configured to electrically disconnect the battery from the first node may further include the control system being configured to: when the energy storage unit is charging: electrically connect the break path to the first node prior to opening the main switch; and electrically disconnect the break path after opening the main switch.

The break path may be formed between the first node and across the energy source.

When the break path is formed between the first node and across the energy source, the break path may include a break switch and a break resistor connected in series between the first node and across the energy source.

When the break path includes a break switch and a break resistor connected in series between the first node and across the energy source, the control system being configured to control the power converter to adjust the magnitude of the output voltage to a magnitude of the energy storage unit voltage and control the main switch to electrically connect the energy storage unit to the first node may include the control system being configured to: control the break switch to electrically connect the break path to the first node;

control the power converter to adjust the magnitude of the output voltage at the first node to a magnitude of the energy storage unit voltage; and once the magnitude of the output voltage at the first node is adjusted to the magnitude of the energy storage unit voltage, control the main switch to electrically connect the energy storage unit to the first node and open the break switch to electrically disconnect the break path from the first node.

The break path may also be formed between the first node and a second node, the second node being an electrical connection point between the main switch and the energy storage unit.

When the break path is formed between the first node and a second node, the break path may include a break switch and a break resistor connected in series between the first node and the second node.

When the break path comprises the break switch and the break resistor connected in series between the first node and the second node, the control system being configured to control the power converter to adjust the magnitude of the output voltage to a magnitude of the energy storage unit voltage and control the main switch to electrically connect the energy storage unit to the first node may include the control system being configured to: control the power converter to adjust the magnitude of the output voltage at the first node close to the magnitude of the energy storage unit voltage; control the break switch to electrically connect the break path to the first node; and control the main switch to electrically connect the energy storage unit to the first node and open the break switch to electrically disconnect the break path from the first node.

When the break path comprises the break switch and the break resistor connected in series between the first node and the second node, the control system being configured to electrically disconnect the battery from the first node includes the control system being configured to: when the energy storage unit is discharging: control the power converter to reduce the discharge power from the energy storage unit to be zero; control the main switch to electrically disconnect the energy storage unit from the first node; and control the power converter to operate in MPPT mode; when the energy storage unit is charging: control the power converter to reduce the charge power from the energy storage unit to be zero; control the main switch to electrically disconnect the energy storage unit from the first node; and control the power converter to operate in MPPT mode.

The main switch may include a first main switch and a second main switch connected in series between the first node and the energy storage unit. The first main switch is a power electronics switch that when turned off prevents power from flowing from the first node to the battery and when turned on allows power to flow. The second main switch is a power electronics switch that when turned off prevents power from flowing from the battery to the first node and when turned on allows power to flow.

When the energy storage system includes the first and second main switches, and the break path includes the break switch and break resistor connected in series between the first node and across the energy storage unit, the control system being configured to control the power converter to adjust the magnitude of the output voltage to a magnitude of the energy storage unit voltage and control the main switch to electrically connect the energy storage unit to the first node may include the control system being configured to: control the break switch to electrically connect the break path to the first node; control the power converter to adjust the magnitude of the output voltage at the first node to the magnitude of the energy storage unit voltage; control the first main switch to turn on such that power can flow into the energy storage unit but not from the energy storage unit; control the break switch to electrically disconnect the break path from the first node; and control the second main switch to turn on such that power can flow bi-directionally.

When the energy storage system includes the first and second main switches, and the break path includes the break switch and break resistor connected between the first node and the second node, the control system being configured to control the power converter to adjust the magnitude of the output voltage to a magnitude of the energy storage unit voltage and control the main switch to electrically connect the energy storage unit to the first node may include the control system being configured to: control the break switch to electrically connect the break path to the first node; control the first main switch and the second main switch to turn on such that power can flow bi-directionally; control the break switch to electrically disconnect the break path from the first node.

When the energy storage system includes the first and second main switches, and the break path includes the break switch and break resistor connected in series between the first node and across the energy storage unit, the control system being configured to electrically disconnect the battery from the first node may include the control system being configured to: control the power converter to reduce the discharge power from the energy storage unit; control the first main switch to open; control the second main switch to open such that the energy storage unit is electrically disconnected from the first node; control the power converter to reduce a charge power of the energy storage unit, control the second main switch to open such that power cannot flow from the battery to the first node; control the break switch to electrically connect the break path to the first node; control the first main switch to open such that the energy storage unit is electrically disconnected from the first node and control the break switch to electrically disconnect the break path from the first node; and control the power converter to operate in MPPT mode.

When the energy storage system includes the first and second main switches, and the break path includes the break switch and break resistor connected between the first node and the second node, the control system being configured to electrically disconnect the battery from the first node includes the control system being configured to: when the energy storage unit is discharging: control the power converter so as to reduce the discharge power from the energy storage unit; control the first main switch to open; and control the second main switch to open such that the energy storage unit is electrically disconnected from the first node; when the energy storage unit is charging: control the power converter to reduce a charge power of the energy storage unit; control the second main switch to open such that power cannot flow from the battery to the first node; control the first main switch to open such that the energy storage unit is electrically disconnected from the first node; and control the power converter to operate in MPPT mode.

The energy storage unit may be a battery.

The power source may be a photovoltaic (PV) array.

In another aspect, a method of electrically connecting an energy storage unit to a power source in an energy storage system comprising the energy storage unit direct DC coupled to the power source at a first node through a main switch and a power converter electrically connected to the first node and capable of adjusting a voltage at the first node, comprises: attempting to adjust the magnitude of the voltage at the first node to a magnitude of an energy storage unit voltage; and closing the main switch to electrically connect the energy storage unit to the first node.

Attempting to adjust the magnitude of the voltage at the first node to a magnitude of an energy storage unit voltage and closing the main switch to electrically connect the energy storage unit to the first node may comprise: determining whether adjusting the magnitude of the voltage at the first node to the magnitude of the energy storage unit voltage will cause power to exceed the power converter's limits; and when adjusting the magnitude of the voltage at the first node to the magnitude of the energy storage unit voltage will not cause power to exceed the power converter's limits; closing the main switch to electrically connect the energy storage unit to the first node once the magnitude of the voltage at the first node matches the magnitude of the energy storage unit voltage.

Attempting to adjust the magnitude of the voltage at the first node to a magnitude of an energy storage unit voltage and closing the main switch to electrically connect the energy storage unit to the first node further may further comprise: when adjusting the magnitude of the voltage at the first node to the magnitude of the energy storage unit voltage will cause power to exceed the power converter's limits: electrically connecting a break path to the first node for diverting power away from the first node; adjusting the magnitude of the voltage at the first node to match the magnitude of the energy storage unit voltage; and once the magnitude of the voltage at the first node is adjusted to match the magnitude of the energy storage unit voltage, electrically connecting the energy storage unit to the first node and electrically disconnecting the break path from the first node.

Attempting to adjust the magnitude of the voltage at the first node to a magnitude of an energy storage unit voltage and closing the main switch to electrically connect the energy storage unit to the first node may further comprise: electrically connecting a pre-charge break path comprising a pre-charge switch and a pre-charge resistor connected in series between the first node and a second node, the second node being an electrical connection point between the main switch and the energy storage unit; closing the main switch to directly electrically connect the energy storage unit to the first node; and opening the break switch to electrically disconnect the pre-charge break path.

The main switch may comprise a first main switch and a second main switch, and attempting to adjust the magnitude of the voltage at the first node to a magnitude of an energy storage unit voltage and closing the main switch to electrically connect the energy storage unit to the first node may further comprise: when adjusting the magnitude of the voltage at the first node to the magnitude of the energy storage unit voltage will cause power to exceed the power converter's limits: electrically connecting a break path to the first node for diverting power away from the first node; adjusting the magnitude of the voltage at the first node to the magnitude of the energy storage unit voltage; turning on the first main switch such that power can flow into the energy storage unit but not from the energy storage unit; electrically disconnecting the break path from the first node; and turning on the second main switch such that power can flow bi-directionally.

In another aspect, a method of electrically disconnecting an energy storage unit from a power source in an energy storage system comprising the energy storage unit direct DC coupled to the power source at a first node through a main switch and a power converter electrically connected to the first node and capable of adjusting a magnitude of a voltage at the first node comprises: when the energy storage unit is discharging: controlling the power converter to reduce a discharge power of the energy storage unit; opening the main switch to electrically disconnect the energy storage unit from the first node; and controlling the power converter to operate in maximum power point tracking (MPPT) mode; when the energy storage unit is charging: controlling the power converter to reduce a charge power of the energy storage unit; opening the main switch to electrically disconnect the energy storage unit from the first node; and controlling the power converter to operate in maximum power point tracking (MPPT) mode.

The method of electrically disconnecting an energy storage unit from a power source may further comprise, when the energy storage unit is charging: electrically connecting a break path to the first node prior to opening the main switch to divert power away from the first node; and electrically disconnecting the break path after opening the main switch.

In the method of electrically disconnecting an energy storage unit from a power source, the main switch may comprise a first main switch and a second main switch, and opening the main switch to electrically disconnect the energy storage unit from the first node may comprise: prior to electrically connecting the break path, opening the second main switch such that power cannot flow from the energy storage unit to the first node; and after closing the break switch, opening the second main switch to electrically disconnect the energy storage unit from the first node.

In another aspect, a power converter for coupling with a power source and at a first node and for controlling electrical connection and disconnection of an energy storage unit that is direct DC coupled to the first node comprises: a power inverter for converting DC to AC, the power converter having a DC input port coupled to the first node and an AC output port coupled to a bus; a control system for controlling the electrical connection and electrical disconnection of the energy storage unit from the first node, the control system being configured to: control the power inverter to adjust the magnitude of the output voltage at the first node to a magnitude of the energy storage unit voltage; control the electrical connection and the electrical disconnection of the energy storage unit with the first node.

The control system being configured to control the power inverter to adjust the magnitude of the output voltage to a magnitude of the energy storage unit voltage and control the electrical connection of the energy storage unit to the first node may include the control system being configured to: electrically connect a break path to the first node for diverting power away from the first node; control the power inverter to adjust the magnitude of the output voltage at the first node to the magnitude of the energy storage unit voltage; once the magnitude of the output voltage at the first node is adjusted to the magnitude of the energy storage unit voltage, electrically connect the energy storage unit to the first node and electrically disconnect the break path from the first node.

The control system being configured to electrically disconnect the energy storage unit from the first node may include the control system being configured to: when the energy storage unit is discharging: control the power inverter to reduce a discharge power of the energy storage unit; electrically disconnect the energy storage unit from the first node; and control the power inverter to operate in maximum power point tracking (MPPT) mode; when the energy storage unit is charging: control the power inverter to reduce a charge power of the energy storage unit; electrically disconnect the energy storage unit from the first node; and control the power inverter to operate in maximum power point tracking (MPPT) mode.

The control system being configured to electrically disconnect the energy storage unit from the first node may further include the control system being configured to: when the energy storage unit is charging: electrically connect a break path to the first node prior to electrically disconnecting the energy storage unit to divert power away from the first node; electrically disconnect the energy storage unit; and electrically disconnect the break path.

BRIEF DESCRIPTION OF THE FIGURES
(NON-LIMITING EMBODIMENTS OF THE DISCLOSURE)

FIGS. 7A and 7B are flowcharts showing a method of disconnecting an energy storage unit in a direct DC connected energy storage system according to an embodiment.

FIGS. 9A and 9B are flowcharts showing a method of disconnecting an energy storage unit in a direct DC connected energy storage system according to another embodiment.

FIGS. 11A and 11B are flowcharts showing a method of disconnecting an energy storage unit in a direct DC connected energy storage system according to another embodiment.

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Figure 1:
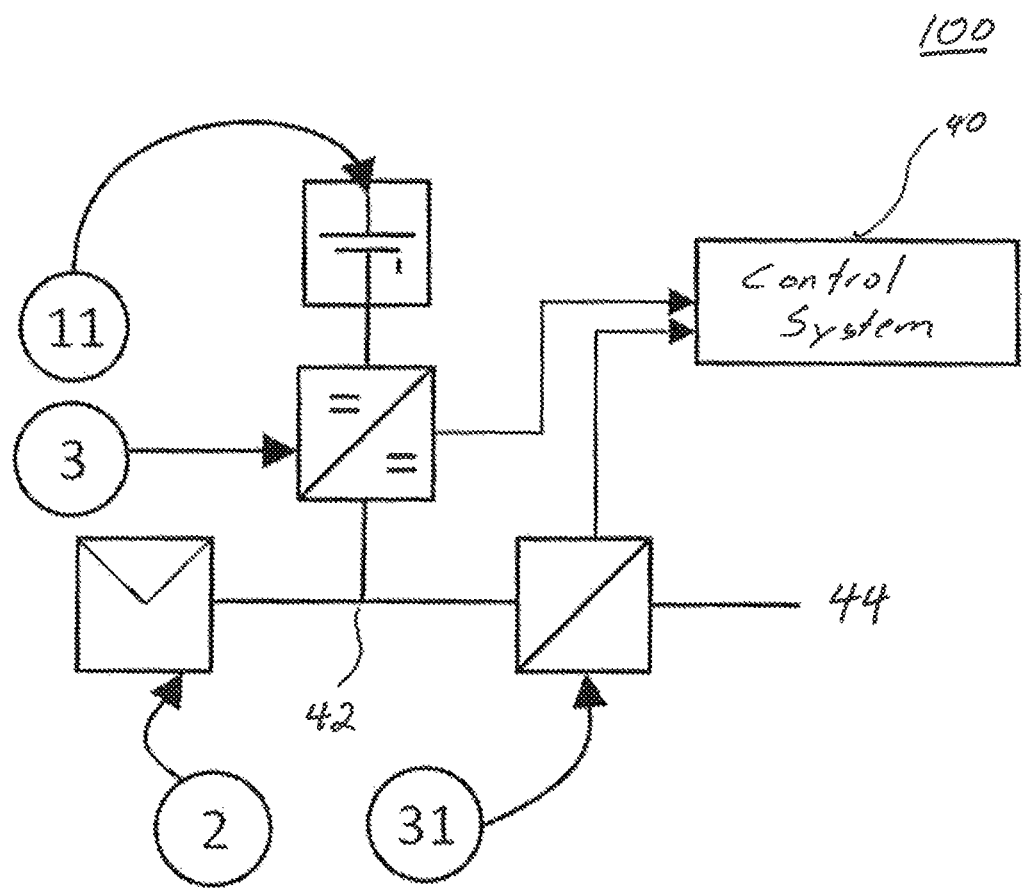
FIG. 1 shows an energy storage system in which an energy storage unit is coupled to a power source through a DC/DC converter.

FIG. 1 shows an energy storage system in which an energy storage unit is coupled to a power source through a DC/DC converter.

Referring to FIG. 1, an energy storage system 100 includes a PV array 2, an inverter 31, an energy storage unit 11, a DC/DC converter 3, a control system 40, a DC bus 42 and an AC bus 44. The AC bus 44 may, for example, be connected to a utility grid, local loads, and/or another microgrid.

The control system 40 for the energy storage system 100 coordinates the operation of the converter 3 and the inverter 31. The control system 40 communicates with sensors that provide the control system 40 with the information to perform any necessary synchronization and to control the flow of power to/from the AC bus 44 and the flow of power to/from the energy storage unit 11. The sensors may be positioned at the DC bus 42, the AC bus 44 and the output/input of the energy storage unit 11. In FIG. 1, the control system 40 may control the inverter 31 to operate in maximum power point tracking (MPPT) mode in order to maximize the amount of power supplied by the PV array 2 to the grid connected to the AC bus 44. The inverter 31 may also be controlled by the control system 40 to supply power from the AC bus 44 to the DC bus 42, where the power can then in turn be supplied to the energy storage unit 11. The DC/DC converter 3 is controlled by the control system 40 to convert the voltage at the DC bus 42 to the magnitude of the DC energy storage unit 11 so that energy can be supplied to the energy storage unit 11 for storage, or so that energy may be provided by the energy storage unit 11 to the AC bus 44.

Although the energy storage system 100 can be implemented in a manner that allows for efficient transmission of power to loads at the AC bus 44 while also having the capability to store energy in the energy storage unit 11, this system requires the use of two power converters, specifically, a power inverter 31 and a DC/DC power converter 3. These power converters can be expensive, require time and expertise to implement in the field, and take up space.

Embodiments of the present invention include an energy storage system capable of direct DC coupling an energy storage to an output port of an energy source. Embodiments of the present invention also include methods for connecting and disconnecting the direct DC coupled energy storage unit, which allow the energy storage unit to be safely connected to and disconnected from the power source, and which also allow the output node of the energy source to be controlled in both MPPT mode as well as a current control mode.

Figure 2:
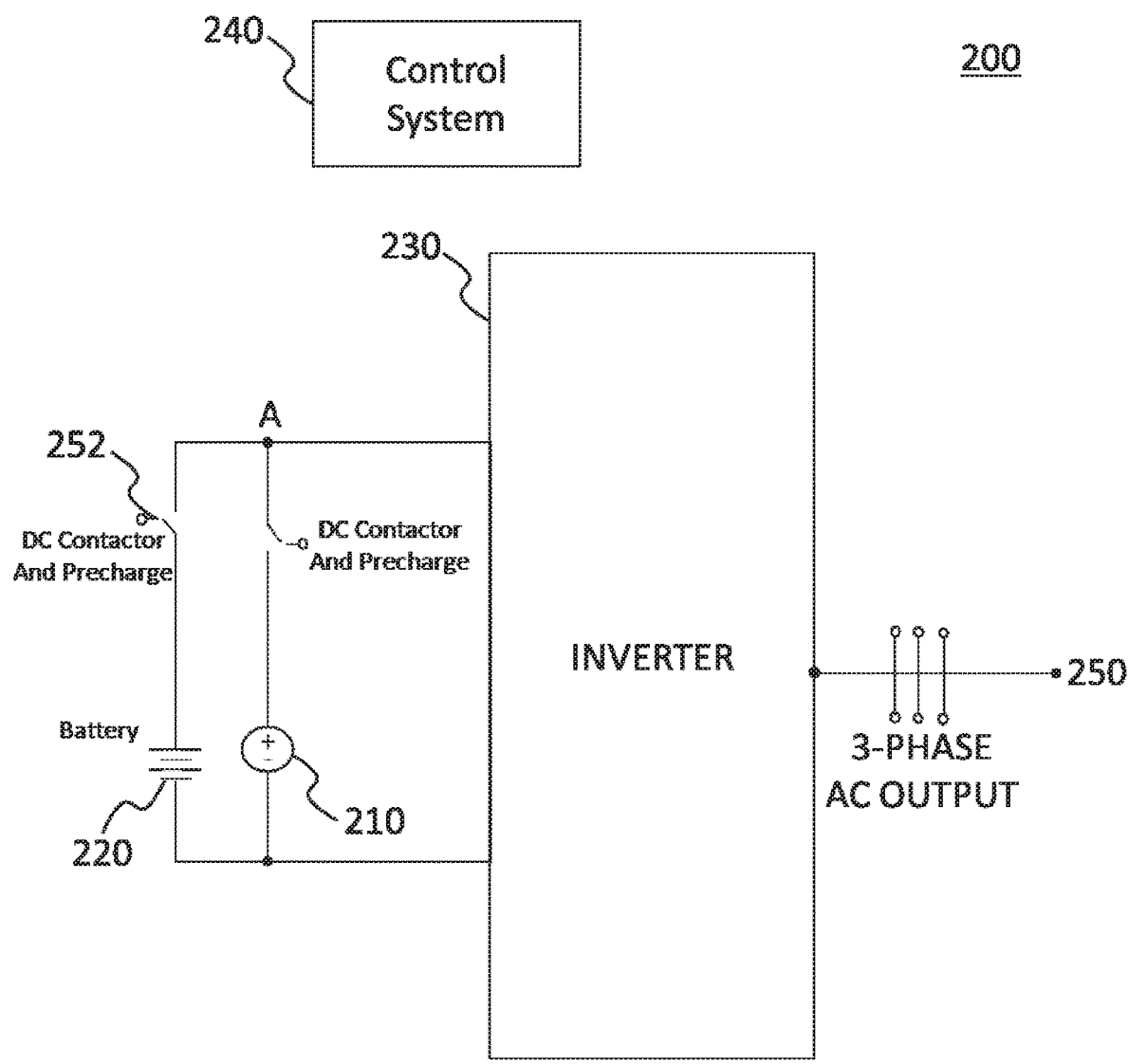
FIG. 2 shows an energy storage system according to an embodiment in which an energy storage unit is directly coupled to a power source.

FIG. 2 shows an energy storage system 200 according to an embodiment in which an energy storage unit 220 is direct DC coupled to a power source 210.

Referring to FIG. 2, the energy storage system 200 includes a power source 210, an energy storage unit 220, a power converter 230 and a control system 240. A first port of the power converter 230 is coupled to an output port of the power source 210 at node A, and a second port of the power converter is coupled to a bus 250, which may, e.g., be connected to a utility grid, local loads, and/or another microgrid. The energy storage unit 220 is direct DC coupled to the power source 210 at node A. Herein, direct DC coupled means that the energy storage unit 220 is coupled to the power supply 210 without an intervening DC/DC power converter, such as the DC/DC power converter 3 shown in FIG. 1. The control system 240 controls the power converter 230 and may be configured to connect and disconnect the energy storage unit 220 to/from node A.

In the embodiment shown in FIG. 2, the power converter 230 is a power inverter that converts the DC voltage at node A to an AC voltage having a predetermined magnitude and a phase and frequency that are synchronized with the grid to which the bus 230 is connected. The energy storage unit 220 is illustrated as a battery, and the power source 210 is illustrated as a PV array. However, it should be understood that the energy storage unit 220 and power source 210 are not limited to these particular types. For example, the energy storage unit may, e.g., be a battery, a capacitor, etc.; and the power supply may, for example, be a PV array or another DC power source such as fuel cells, etc.

In order to connect and disconnect the energy storage unit 220 from the power source 210, the energy storage system 200 may further include a main switch 252. The main switch 252 is coupled between the energy storage unit 220 and the node A. The main switch 252 is controlled by the control system 240 to connect and disconnect the energy storage unit 220 from the power source 210 and from the converter 230. The main switch 252 may, for example, be a mechanical switch such as a DC contactor. However, it should be understood the main switch 252 is not limited to any particular type, and may be another type of switch such as one or more power electronics switches.

In controlling the power converter 230, the control system 240 may control the power converter 230 to operate in either a voltage/MPPT control mode or a current control/power control mode. For example, when the energy storage unit 220 is disconnected from the power source 210, the control system 240 may control the power converter 230 to operate in MPPT mode. When operating in the MPPT mode, the controller controls the power converter 230 to control the voltage at node A to which the output port of the power source 210 is connected. Based on the power source's 210 power vs. voltage curve, the power source 210 will output power which then goes into the PV inverter and into, e.g., the grid connected to the bus 250. The control system 240 monitors the output power of the power source 210 by, for example, using sensors located at node A, and the control system 240 varies the voltage at node A to determine the maximum output power.

The following is an example of a perturb and disturb method of implementing an MPPT mode to aid in understanding. In an example, the control system 240 may control the voltage at node A to be 1000V, and then observe the output power of the power source as 250 kW. The control system 240 may then control the power converter 230 to increase the voltage at node A by 2V, thereby applying 1002V at node A. The control system 240 can then observe the power output for the power source 210 to determine if the power output increases or decreases. If the power increases, the control system 240 can then again increase the voltage at node A and repeat the process until a power increase is no longer observed, at which time the control system 240 can recognize the maximum power point (MPP). If, on the other hand, the power converter 230 initially increases the voltage by 2V and the power decreases, the control system 240 controls the power converter 230 to reduce the voltage at node A until the power returns to its MPP, upon which the system 200 is controlled to operate at the MPP. For renewable energy sources such as PV and wind, the control system 240 can continuously apply MPPT to track the sun cloud cover and solar radiation in the case of PV and wind changes in the case of wind.

When the control system 200 connects the energy storage unit 220 to node A, the control system will control the power converter 230 so that it no longer operates in MPPT mode. In this case, the control system 200 may instead control the power converter 230 to operate in a current control mode or power control mode in which the control system 200 controls the power converter 230 to control its output current or power. When the energy storage unit 220 is connected to the same DC bus as the PV array (i.e., the energy storage unit 220 is connected to node A), the voltage at node A (and hence the voltage on the output port of the power source 210) is now defined by the energy storage unit 220 voltage. Accordingly, the power source 210 output voltage becomes equal to the energy storage unit 220 voltage. In an embodiment, in order to provide for increased energy output, an energy storage unit 220 having a voltage the same or at least very close to the nominal maximum power point of voltage for the PV array is provided.

The control system 240 may be located at any number of places in the energy storage system 200 any may include one or more controllers. In one embodiment, the power converter 230 may be a smart power converter 230 that houses both inverter components, such as inverter switches (e.g., insulated-gate bipolar transistors (IGBTs) or metal-oxide-semiconductor field-effect transistors MOSFETs) as well as a controller that operates as the control system 240. In this case, the smart converter 230 may be configured to open and close the main switch 252 as well as control voltage at node A and the output voltage, current or power at the bus 250. The control system 240 may also communicate with or include a master controller that coordinates with the control system 240, provides sensor readings to the control system 240 and/or controls another microgrid connected to bus 250.

The ability to connect and disconnect the energy storage unit 220 from the power source 210 allows the energy storage system 200 to take advantage of different circumstances affecting the overall power output of the system. For example, the control system 240 may be configured to identify when excess PV power is available that cannot be output by the power converter 230 because of, for example, power converter clipping caused by the output power of the power source 210 exceeding the power converter's 230 rating or a lack of demand at bus 250. It may also be desirable to charge the energy storage unit 220 for later use. In this case, there is a need to connect the energy storage unit 220 to node A.

Prior to connecting the energy storage unit 220 to node A, the power converter 230 is operating directly on the power source 210 and the voltage at node A may be mismatched from the energy storage unit. If the battery is then closed in on onto the DC bus (i.e., the battery is electrically connected to node A) there can be substantial in-rush current.

When the battery is fully charged, or the batter voltage is curtailing the power source 210 output too much and/or the power converter 230 MPPT is required, it may be desirable to disconnect the battery from node A. One way to disconnect the energy storage unit 220 from node A is to simply open the main switch 252. However, stopping the power converter 230 and the energy storage unit 220 simultaneously has drawbacks in that over-currenting of the battery may occur (e.g., in the case in which there is excess power from the power source that the energy storage unit 220 will need to sink). Stopping the power converter 230 with the energy storage unit 220 connected to the source 210 has a potential to over current the battery in the case where the battery will need to sink all the power generated by the source. Thus, energy storage unit 220 must be disconnected before power converter 230 is stopped.

Figure 3:
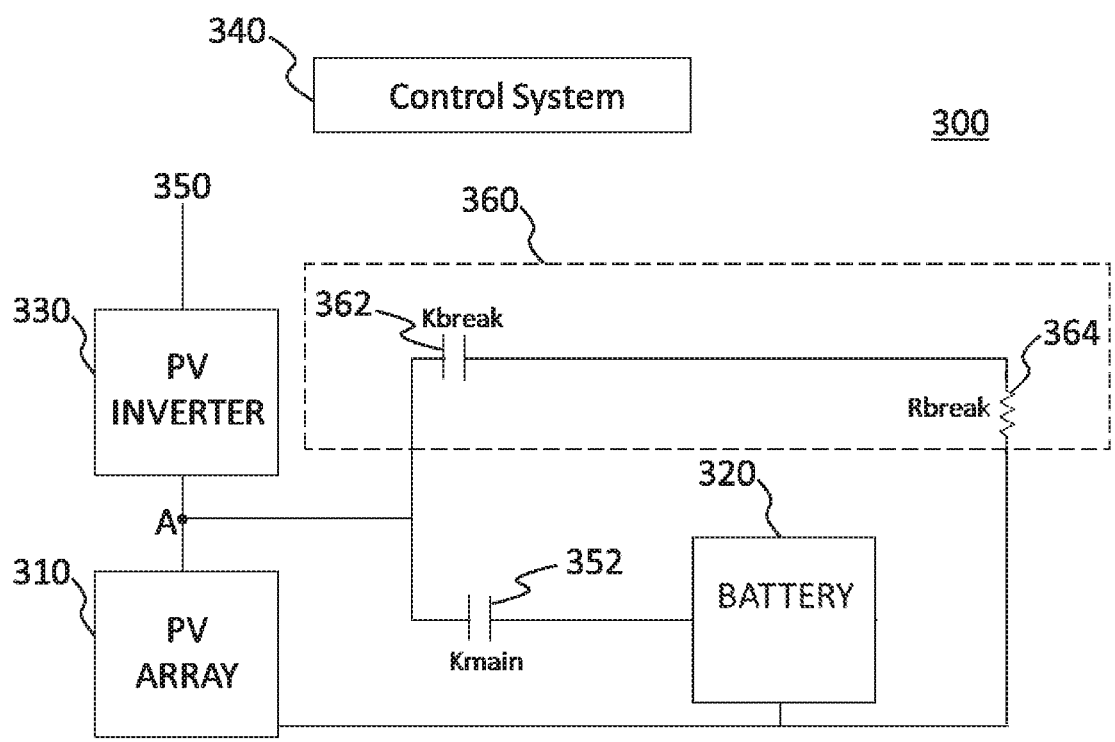
FIG. 3 shows an energy storage system for dynamically connecting and disconnected an energy storage unit from a power source according to an embodiment.
Figure 4:
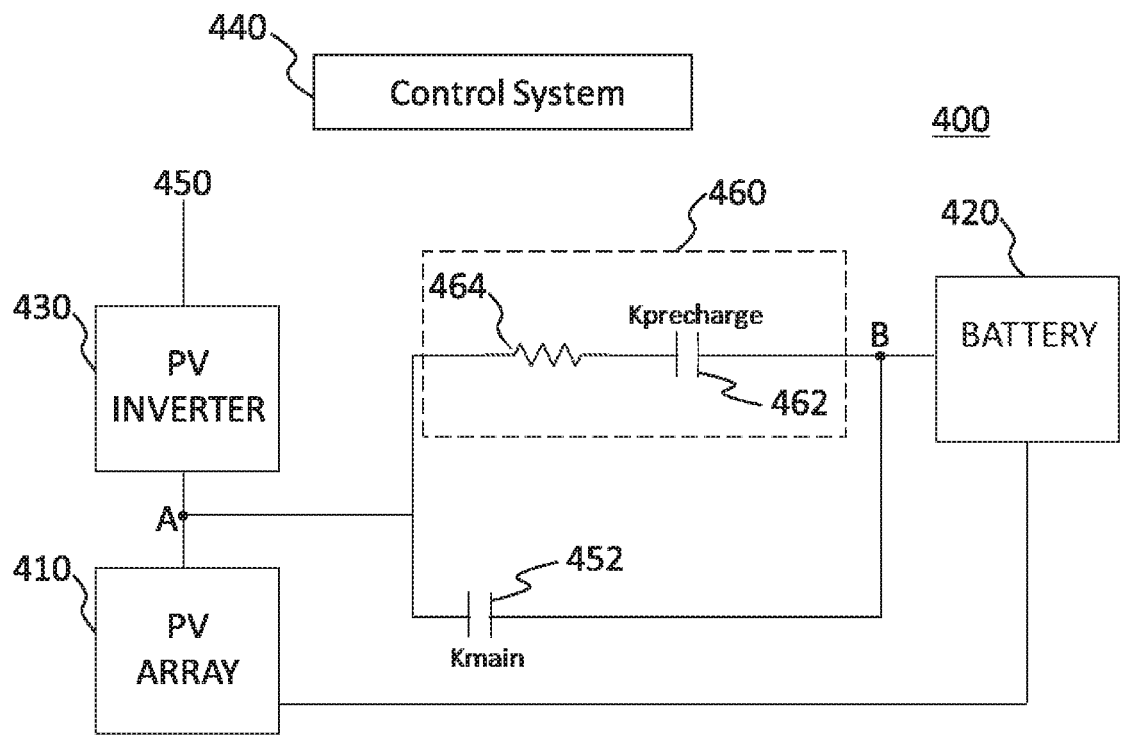
FIG. 4 shows an energy storage system for dynamically connecting and disconnected an energy storage unit from a power source according to another embodiment.
Figure 5:
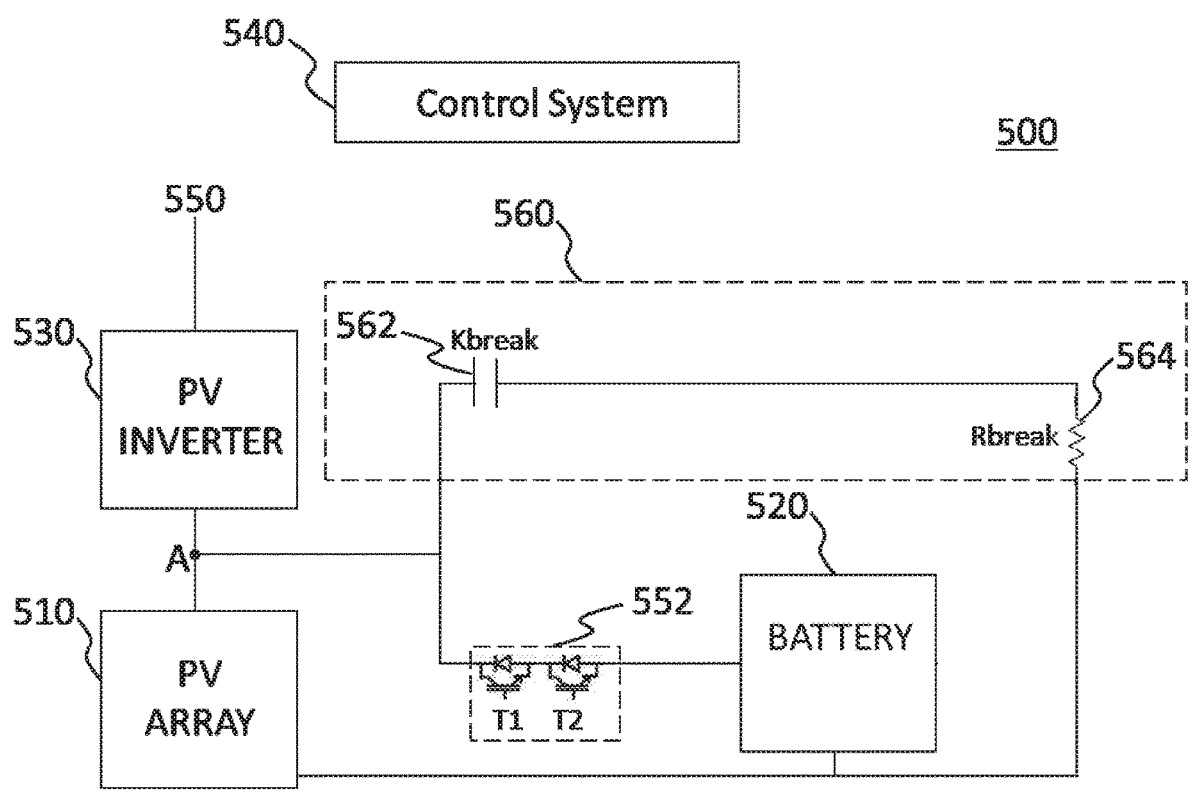
FIG. 5 shows an energy storage system for dynamically connecting and disconnected an energy storage unit from a power source according to another embodiment.

FIGS. 3-5 show energy storage units according to embodiments of the present invention for limiting high in-rush currents in the energy storage system.

FIG. 3 shows an energy storage system for dynamically connecting and disconnected an energy storage unit from a power source according to an embodiment.

Referring to FIG. 3, an energy storage system 300 for limiting in-rush current according to an embodiment of the present invention includes a power source 310, an energy storage unit 320, a power converter 330, and a break path 360. One port of the power converter 330 is coupled to the output port of the power source 310 at node A, which may also be referred to as the DC bus, and the other port of the power converter 330 may be connected to a bus 350 (e.g., an AC bus when the power converter 330 is a power inverter). The energy storage unit 320 is direct DC coupled to the output port of the power source 310 at node A.

As explained above, it is advantageous to have the ability to electrically connect and electrically disconnect the energy storage unit 320 from node A. The electrical connection/disconnection may be accomplished using main switch 352. The control system 340 controls the main switch 352 to open and close in order to electrically connect/disconnect the energy storage unit 320.

When connecting the energy storage unit 320 to node A, the energy storage unit 320 voltage will not necessarily be equal to the voltage at node A, particularly when the control system 340 is controlling the power converter 330 to operate in MPPT mode. Directly connecting the energy storage unit 320 under these circumstances may result in high in-rush currents, which could cause damage to the energy storage unit 320 and/or the power converter 330. In order to reduce the in-rush currents on the energy storage unit 320 and power converter 330, the control system 340 may be configured to control the power converter 330 to adjust the voltage at node A to the energy storage unit 320 voltage by making the voltage at node A equal to or very close to (e.g., within 3% of) the energy storage unit 320 voltage, such that in-rush current is limited. When the voltage at node A is adjusted to the energy storage unit 320 voltage, in-rush will be limited when the main switch 352 is closed, because the voltage at node A is equal or very close to the energy storage unit 320 voltage.

Although adjusting the voltage at node A to match the energy storage unit 320 voltage will limit in-rush current, it is possible that the power output of the power converter 330 could exceed the power converter's limits 330. Such an instance may occur in an example in which the power source 310 (e.g. a PV array) is oversized with respect to the power converter 330, or in other words, when the maximum power output of the power source 310 exceeds the power converter's 330 rating. If the power converter 330 is operating at its power rating, and the power source 310 is operating in a "clipped" fashion, the power converter 330 is not extracting all the power being produced by the power source 310. In this instance, if the power converter 330 changes the voltage at node A in order to connect the energy storage unit 320, it is possible that the power source 310 moves to a voltage that produces a higher output power, which would then be higher than the rating of the power converter 330. The power converter 330 cannot handle an output power greater than its rating, as the power converter 330 will not be able to sink to the grid connected to bus 350.

In order to prevent a situation in which controlling the voltage at node A to be equal or close to equal to the energy storage unit 320 voltage raises the power output above the power converter 330 rating, the embodiment shown in FIG. 3 includes a break path 360. The break path 360 is coupled to node A and diverts power away from node A. In the embodiment shown in FIG. 3, the break path 360 comprises a break switch 362 and a break resistor 364 coupled in series across the energy source 310.

Figure 6:
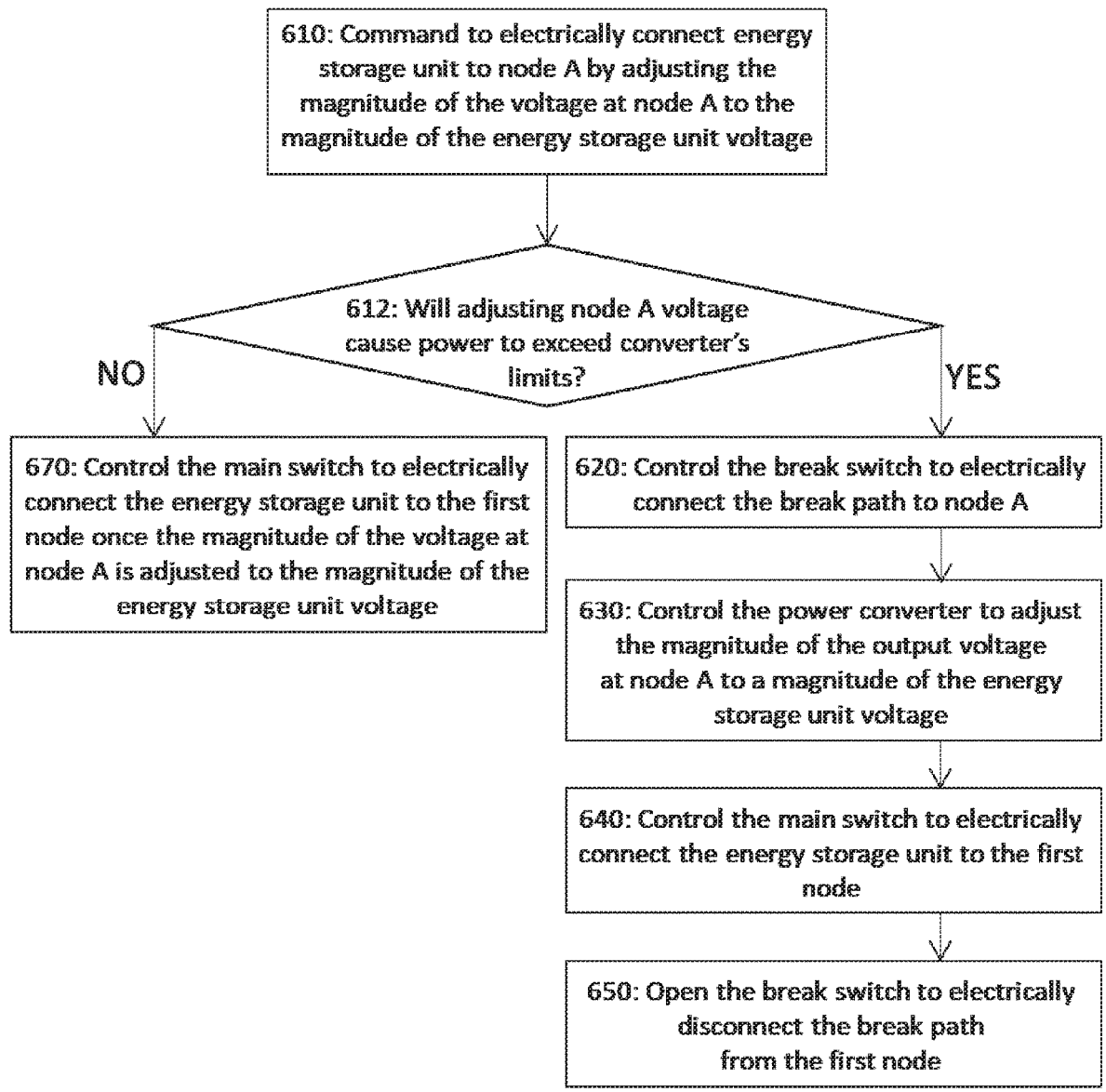
FIG. 6 is a flowchart showing a method of connecting an energy storage unit in a direct DC connected energy storage system according to an embodiment.

FIG. 6 is a flowchart for illustrating a method of connecting an energy storage unit 320 in a direct DC connected energy storage system 300 according to an embodiment. Referring to FIGS. 3 and 6, prior to connecting the energy storage unit 320, the control system 340 may be controlling the power converter 330 in a voltage control/MPPT mode in which the control system 340 is controlling the power converter 330 to adjust the voltage at node A to a MPP. In this case, the voltage at node A will not necessarily be equal to the energy storage unit 320 voltage. As explained above, when adjusting the voltage at node A to the energy storage unit 320 voltage, the power converter 330 output may be reduced or increased (based on the operating point of the energy source). If the power converter 330 output does not exceed the power converter 330 limits (due to clipping or rating, etc), the break path 360 need not be activated. In this case, the control system controls the power converter 330 to adjust the voltage at node A to the energy storage unit 320 voltage, and then closes the main switch 352 to electrically connect the energy storage unit 320 to node A (Steps 610 and 670).

The control system 340 may observe that adjusting the voltage at node A to the energy storage unit 320 voltage would increase power output to above the power converter's 330 limits in step 612. The control system 340 may determine that adjusting the voltage at node A to the energy storage unit voltage would increase power output to above the power converter's 330 limits by, for example, determining that the power converter 330 is operating in a clipped manner (i.e., the actual power output by the power converter 330 is less that the maximum power available from the power source 310) or determining that the power converter 330 is operating at its power rating or close to it.

To allow room for the excess power generated when adjusting the voltage at node A, in step 620, the control system controls the break switch 362 to electrically connect the break path 360 to node A. Then, in step 630, the control system 340 controls the power converter 330 to adjust the magnitude of the output voltage at node A to a magnitude of the energy storage unit 320 voltage. In adjusting the magnitude of the output voltage, the control system 340 may control the power converter 330 to adjust the magnitude of the output voltage to be equal to or very close to (e.g., within 3% of) the magnitude of the energy storage unit 320 voltage. Once the magnitude of the output voltage at the node A is adjusted to the magnitude of the energy storage unit 320 voltage, in step 640, the control system controls the main switch 352 to electrically connect the energy storage unit 320 to node A, and in step 640, controls the break switch 362 to electrically disconnect the break path 360 from node A. At this point, the voltage at node A will be defined by the energy storage unit 320 voltage, and the energy storage unit 320 can charge with power from the power source or discharge to provide power to a grid connected to bus 350.

Once the energy storage unit 320 and the power source 310 are electrically connected, the control system 340 controls the power converter 330 in current control or power control mode to charge or discharge the energy storage unit 320. For example, when the power converter 330 is switched to operate in a power control mode once the battery is electrically connected to node A, the control system may receive or generate a power command for the power converter 330 to output no power. Thus, at this time, any power being generated by the power source 310 will be stored in the energy storage unit, because the power converter 330 is commanded to output no power. If the control system 340 receives or generates a power command to output a portion of the power generated by the power source 310 to the grid 350, the control system 340 controls the power converter 330 to output the commanded power output, and the remaining power generated by power source 310 is stored in the energy storage unit 320. If the control system 340 receives or generates a power command to output an amount of power that is greater than the power produced by the power source 310, when the power system controls the power converter 330 to output the commanded amount of power, the energy storage unit 320 will then discharge so as to supplement the power produced by the power source 310. Thus, the control system 340 can be said to control the power converter 330 to pull the power source power and/or energy storage unit power out of node A (i.e. the DC bus).

In general, for disconnecting the energy storage unit 320 from node A, the main switch 352 can be opened at any time as long as the power converter 330 is operating in power or current control mode. However, it is possible that the main switch 352 is opened under load (i.e., while current is flowing through the main switch 352) when the energy storage unit 320 is charging or discharging, which can be damaging to the switch. Thus, it is desirable to reduce the current flowing through the main switch 320 prior to opening the main switch 320. One method of reducing the current in the main switch 352 when disconnecting according to an embodiment is as follows. The power converter 330 is operated in power mode, and the power command is adjusted by the control system 340 so as to make power flow into battery storage unit 320 zero or close to zero. Then, the main switch 352 is opened. However, in some cases, the power converter 330 may be limited and will not be able to control energy storage power to be zero. In that case, in an embodiment, the break path 360 can be employed to sink additional power.

FIGS. 7A and 7B are flowcharts for illustrating a method of disconnecting an energy storage unit in a direct DC connected energy storage system according to an embodiment.

Referring to FIGS. 3 and 7A, if the energy storage unit 320 is discharging, in step 710, the control system 340 controls the power converter 330 to reduce the discharge power of the energy storage unit 320 to zero (or close to zero, e.g., within 3%) by, e.g. controlling the power converter 330 to output no power. Then, in step 720, the control system 340 controls the main switch 352 to open so that the energy storage unit 320 is electrically disconnected from node A. Once the energy storage unit 320 is electrically disconnected, in step 730, the control system 340 controls the power converter 330 to operate in voltage control/MPPT mode.

If the energy storage unit 320 is charging, the energy storage unit may be disconnected in the same manner as that shown in FIG. 7A. That is, the control system may control the power converter to reduce the charge power into the energy storage unit to zero in order to reduce the current when the main switch 352 is opened; the control system 340 may then control the main switch to open; and then control the power converter 330 to operate in MPPT mode. However, due to limitations on the converter 310 output on bus 350, it may not be possible to control the energy storage unit power to be zero. Under these circumstances, the control system may control the switch to open under a reduced load. Referring to FIG. 7B, in step 712, the control system 340 reduces the charge power as much as possible to reduce the current through the main switch 352. In one embodiment, the main switch 352 may be opened under this reduced current. However, in another embodiment, to further reduce the current through the main switch under circumstances in which the energy storage power cannot be reduced all the way to zero, an additional step may be added to introduce the break path 360.

Referring to FIGS. 3 and 7B, a step of electrically connecting the break path 360 to node A is added to reduce the current through the main switch 352 when the main switch 352 is opened under conditions where the power converter cannot control the energy storage discharge power all the way to zero. In this embodiment, in step 722, the control system 340 controls the break switch 362 to close to electrically connect the break path to node A so that power from the power source 310 is diverted to the break resistor 364. Then, in step 732, the control system controls the main switch to open to electrically disconnect the energy storage unit 320 from node A. By connecting the break path 360 prior to opening main switch 352, current on the main switch 352 is reduced when the main switch 352 is opened. Once the main switch 352 is opened, in step 742, the break path is disconnected by opening the switch 362. Finally, in step 752, the control system 340 controls the power converter 330 to operate in voltage control/MPPT mode.

In an embodiment, the break resistor 364 is rated to the oversize of the power source 310. The oversize is the difference between the maximum amount of power that the power source 310 can produce and the power converter 330 rating.

FIG. 4 shows an energy storage system for dynamically connecting and disconnected an energy storage unit from a power source according to another embodiment.

Referring to FIG. 4, an energy storage system 400 for limiting in-rush current according to an embodiment of the present invention includes a power source 410, an energy storage unit 420, a power converter 430, and a break path 460. One port of the power converter 430 is coupled to the output port of the power source 410 at node A, which may also be referred to as the DC bus, and the other port of the power converter 430 may be connected to a bus 450 (e.g., an AC bus when the power converter 430 is a power inverter). The energy storage unit 420 is direct DC coupled to the output port of the power source at node A.

The energy storage system 400 shown in FIG. 4 has components common to those of FIG. 3, and a detailed description of the common components will be omitted for brevity. The energy storage system 400 of FIG. 4 is different from that of FIG. 3, in that the break path 460 in the embodiment shown in FIG. 4 comprises a break resistor 464 and a break switch 462 connected in series between node A and a node B, which is an electrical connection point between the main switch 452 and the energy storage unit 420. Thus, the break resistor 464 and break switch 462 can be understood as a pre-charge resistor 464 and a pre-charge switch 462.

Figure 8:
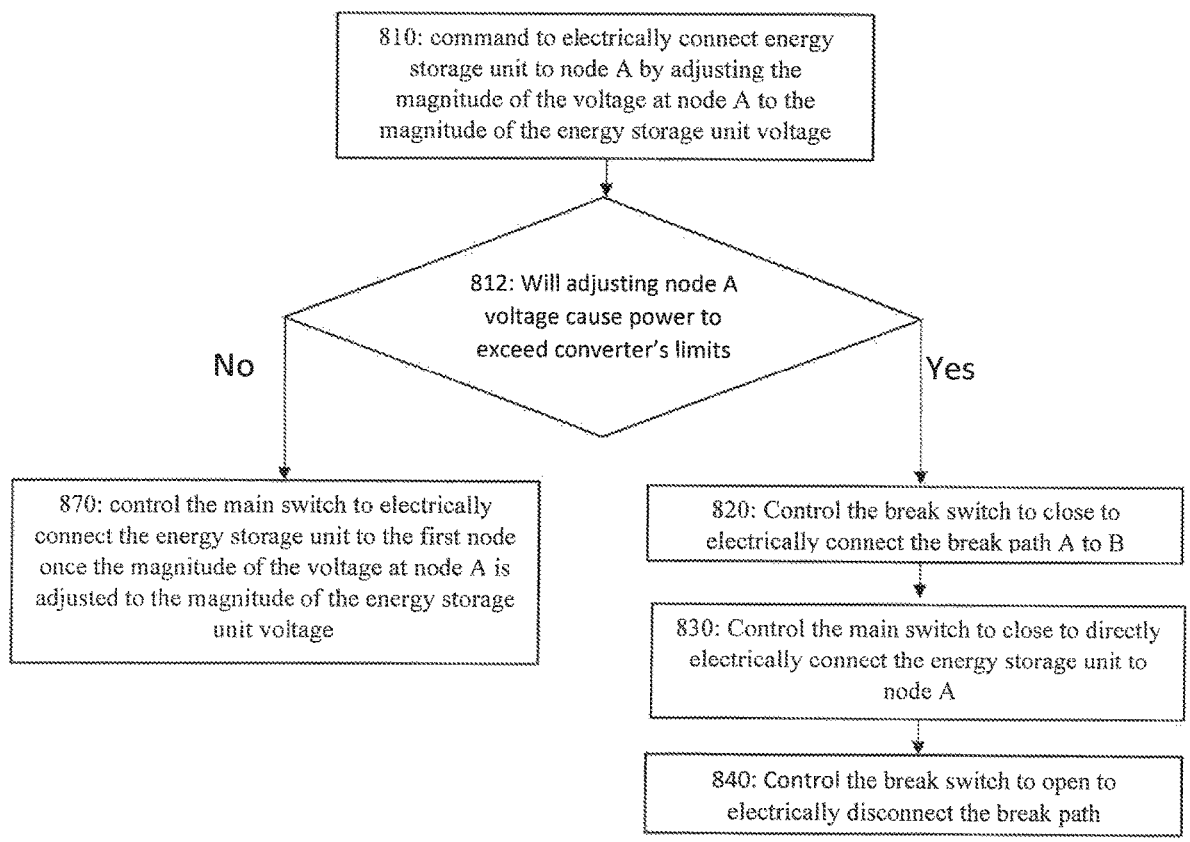
FIG. 8 is a flowchart showing a method of connecting an energy storage unit in a direct DC connected energy storage system according to another embodiment.

FIG. 8 is a flowchart for illustrating a method of connecting an energy storage unit in a direct DC connected energy storage system 400 such as that shown in FIG. 4. Referring to FIGS. 4 and 8, similar to the embodiment shown in FIG. 3, when the energy storage unit 420 is to be connected to the power source 410, the power converter 430 will attempt to adjust the voltage at node A to match the voltage of the energy storage unit (step 810). The control system 440 may observe that adjusting the voltage at node A to the energy storage unit voltage would change the power converter 430 output. If the control system 440 determines that the voltage at node A can be adjusted to the voltage of the energy storage unit 420 without exceeding the power converter 430 limits, the main switch is closed in step 870.

When attempting to adjust the voltage at node A to the energy storage unit 420 voltage, the control system 420 may determine that the power output of the power source 410 would exceed the rating of the power converter 430 if the voltage at node A were adjusted to match the voltage of the energy storage unit 420. In this case, instead of (or in addition to) actually adjusting the voltage at node A, in step 820, the control system controls the break switch 462 to close so that the break path 460 is electrically connected to nodes A and B. In this case, the break resistor 464 will limit the in-rush current between the battery and the output port of the power source 410. Once the break switch 462 is closed, either 1) power flows from node A to the energy storage unit 420 or 2) power flows from the energy storage unit 420 to node A. Then, in step 830, the control system controls the main switch 452 to close so that the energy storage unit 420 is directly electrically connected to node A. Once the main switch 452 is closed, the break switch 464 is opened in step 840 to disconnect the break path 460.

Once the energy storage unit 420 and the power source 410 are electrically connected, the control system 440 controls the power converter 430 in current control or power control mode to charge or discharge the energy storage unit 420.

FIGS. 9A and 9B are flowcharts for illustrating a method of disconnecting an energy storage unit in a direct DC connected energy storage system such as that shown in FIG. 4.

Referring to FIGS. 4 and 9A, if the energy storage unit 420 is discharging, in step 910, the control system 440 controls the power converter 430 to reduce the discharge power of the energy storage unit 420 to 0 (or close to zero) by, e.g., controlling the power converter 430 to output no power. Then, in step 920, the control system 440 controls the main switch 452 to open so that the energy storage unit 420 is electrically disconnected from node A. Once the energy storage unit 420 is electrically disconnected, in step 930, the control system 440 controls the power converter 430 to operate in voltage control/MPPT mode.

If the energy storage unit 420 is charging, the energy storage unit may be disconnected in the same manner as that shown in FIG. 9A. Referring to FIG. 9B, the control system may control the power converter to reduce the charge power into the energy storage unit 420 to zero in order to reduce the current when the main switch 452 is opened; the control system 440 may then control the main switch 452 to open; and then control the power converter 430 to operate in MPPT mode. As noted above, due to limitations on the converter 410 output on bus 450, it may not be possible to control the energy storage power to be zero. In this case the control system 440 opens the main switch 452 under reduced load in step 922 (i.e., the charge power is reduced as far as possible and then the main switch 452 is opened).

In the embodiment shown in FIG. 4, when connecting the energy storage unit 420 to node A, if the difference between the power source voltage and the energy storage unit voltage exceeds the resistor rating (Prating=$(V_{power\ source} - V_{energy\_storage\_unit})^2/R_{break}$) the break switch should not be closed. Thus, it is preferable that the rating of the precharge resistor be sufficient to ensure that the difference between the voltages does not exceed the resistor rating.

FIG. 5 shows an energy storage system for dynamically connecting and disconnected an energy storage unit from a power source according to an embodiment.

Referring to FIG. 5, an energy storage system 500 for limiting in-rush current according to an embodiment of the present invention includes a power source 510, an energy storage unit 520, a power converter 530, and a break path 560. One port of the power converter 530 is coupled to the output port of the power source 510 at node A, which may also be referred to as the DC bus, and the other port of the power converter 530 may be connected to a bus 550 (e.g., an AC bus when the power converter 530 is a power inverter). The energy storage unit 520 is direct DC coupled through power electronics switches 552 to the output port of the power source at node A.

The energy storage system 500 shown in FIG. 5 has components common to those in FIG. 3, and a detailed description of the common components will be omitted for brevity. The energy storage system 500 of FIG. 5 is different from that of FIG. 3, in that the main switch 552 comprises two power electronics switches T1 and T2.

Figure 10:
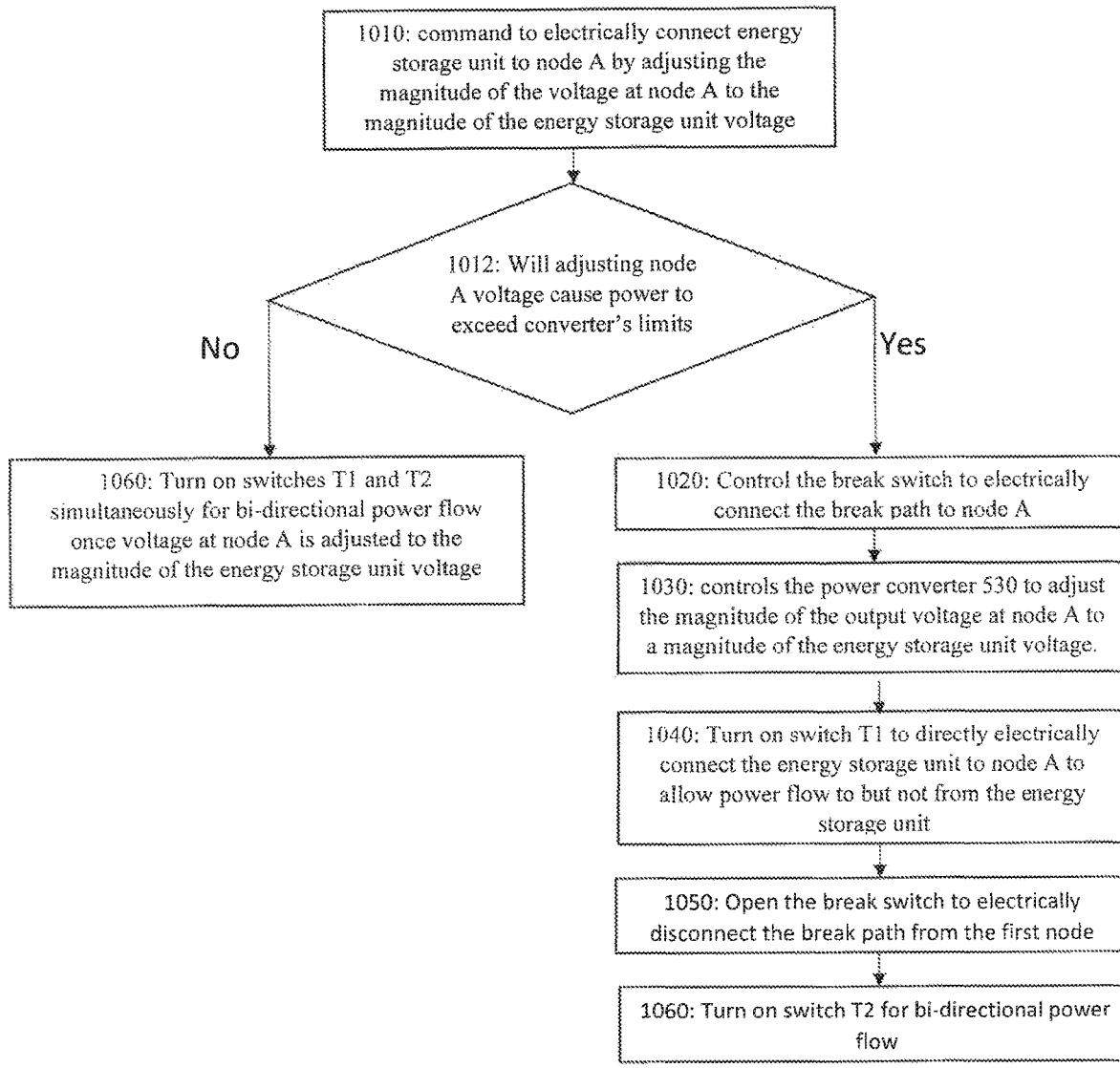
FIG. 10 is a flowchart showing a method of connecting an energy storage unit in a direct DC connected energy storage system according to another embodiment.

FIG. 10 is a flowchart for illustrating a method of connecting an energy storage unit in a direct DC connected energy storage system 500 such as that shown in FIG. 5. Referring to FIGS. 5 and 10, similar to the embodiment shown in FIG. 3, if the energy storage unit is to be directly connected to node A, the control system 540 will attempt to adjust the voltage at node A to match the voltage of the energy storage unit, given in step 1010. The control system 540 may observe that adjusting the voltage at node A to the energy storage unit voltage would change the power output in step 1012. If the control system 540 determines that the voltage at node A equals the voltage of the energy storage unit 520 without power exceeding the power converter's 530 limits, the switches T1 and T2 can be commanded to turn on in step 1060.

The control system 560 may determine that adjusting the voltage at node A to the energy storage unit voltage would increase power output to above the power converter's 530 limits To allow room for the excess power generated when adjusting the voltage at node A, in step 1020, the control system controls the break switch 562 to electrically connect the break path 560 to the node A. Then, in step 1030, the control system 540 controls the power converter 530 to adjust the magnitude of the output voltage at node A to a magnitude of the energy storage unit 520 voltage. In adjusting the magnitude of the output voltage, the control system 540 may control the power converter 530 to adjust the magnitude of the output voltage to be equal to or very close to (e.g., within 3% of) the magnitude of the energy storage unit 520 voltage. Then, in step 1040, the control system turns on the first power electronics switch T1 (T1 may be turned on under zero voltage switching as an example, but other switching techniques may also be used). In this way, power can flow into the energy storage unit 520 but not from the energy storage unit 520 to the break resistor. Once T1 is turned on, in step 1050, the break switch is turned off to electrically disconnect the break path 560. Once the break bath is disconnected, in step 1060, power electronics switch T2 is turned on for bi-directional power flow to/from the energy storage unit 520.

Once the energy storage unit 520 and the power source 510 are electrically connected, the control system 540 controls the power converter 530 in current control or power control mode to charge or discharge the energy storage unit 520.

FIG. 11 is a flowchart for illustrating a method of disconnecting an energy storage unit 520 in a direct DC connected energy storage system 500 such as that shown in FIG. 5. Referring to FIGS. 5 and 10, in step 1110 the control system 540 observes whether the power source 510 is generating power and whether the energy storage unit 520 is charging or discharging. In doing so, the control system 500 may receive current and/or voltage readings at one or more sensors placed at the output port of the power source 510 and the output port of the energy storage unit 520.

If the energy storage unit is discharging or the power supply is outputting zero power (or close), in step 1110, the control system 540 controls the power converter 530 to reduce the discharge power of the energy storage unit to zero or close to zero. Then, in step 1120, the control system 540 turns off both of the switches T1 and T2 so that the energy storage unit 520 is electrically disconnected from the node A. Once the energy storage unit 520 is electrically disconnected, in step 1130, the control system 540 controls the power converter 530 in voltage/MPPT control mode.

If the storage unit 520 is charging, opening the main switch 552 may cause the switch to be opened under load. A method to reduce the current when switch 552 is opened is as follows. In step 1112, the control system 540 attempts to control the power converter so as to reduce the charge power flowing into the storage unit 520. Due to limitations on the converter output on the bus 550, the energy storage unit power may not be able to be reduced all the way to zero. In this case the control system 540 opens the main switch under reduced load. In an embodiment, an additional step of electrically connecting the break path 560 to node A is added if the battery is charging. In this embodiment, in step 1122, the control system 540 controls T2 off so that power cannot flow away from the energy storage unit 520. T2 is opened under zero current conditions because the energy storage unit was charging at this point. Once T2 is open, the control system controls the break switch 562 to close in step 1132 so that the break path 562 is electrically connected to node A and power from the power source 510 is diverted to the break resistor 564. Then, in step 1142, the control system 540 controls the switch T1 to open to electrically disconnect the energy storage unit 520 from node A. By connecting the break path 560 prior to opening the main switch T1, current on the switch T1 is reduced when it is opened. Once the main switch 552 is opened, in step 1152 the break path is disconnected by opening switch 562 and the converter operates in MPPT mode.

The control system of FIGS. 3-5 may be located at any number of places in the energy storage system any may include one or more controllers. In one embodiment, the power converter may be a smart power converter that houses both inverter components, such as inverter switches (e.g., insulated-gate bipolar transistors (IGBTs) or metal-oxide-semiconductor field-effect transistors MOSFETs) as well as a controller that operates as the control system. In this case, the smart converter may be configured to open and close the main switch(s) and the break switch as well as control the voltage at node A and the output voltage, current or power output by the inverter to the AC bus. The control system may also communicate with or include a master controller that coordinates with the control system, provides sensor readings to the control system and/or controls another microgrid connected to the AC bus.

Embodiments of the present invention include energy storage systems and methods for direct DC coupling an energy storage unit (e.g., a battery) and a power source (e.g., a PV array). The energy storage system may include a power source electrically connected to a first node, a power converter coupled between the first node and a bus, an energy storage unit coupled to the first node through direct DC coupling and a control system for controlling the electrical connection and electrical disconnection of the energy storage unit and the power source. In embodiments of the present invention, the control system is configured to control the power converter to adjust the magnitude of the output voltage of the power source to a magnitude of the energy storage unit voltage, which in turn limits harmful in-rush currents. In addition, embodiments of the present invention may also include a break path coupled to the first node for diverting power away from the energy storage unit when the energy storage unit is being electrically connected and/or electrically disconnected from the first node to allow the power converter sufficient space to adjust the voltage at the first node without exceeding its limits and/or to prevent harmful in-rush currents. In addition, embodiments of the present invention include a power converter that includes both an inverter for coupling between the first node and the bus and the control system, where the power converter is for use in an energy storage system that includes the PV array and the direct DC coupled energy storage unit.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. An energy storage system for direct DC coupling, the energy storage system comprising:
   a power source electrically connected to a first node;
   a power converter coupled to the first node, the power converter controlling the output voltage of the power source, the power converter having a first port coupled to the first node and a second port coupled to a bus;
   an energy storage unit direct DC coupled to the power source at the first node through a main switch, wherein the energy storage unit draws energy from the power source or the bus when charging and supplies energy to the bus when discharging;
   the main switch for electrically connecting and electrically disconnecting the energy storage unit from the first node, the main switch being coupled between the first node and the energy storage unit;
   a break path coupled to the first node and for diverting power away from the first node when the break path is electrically connected to the first node;

a control system for controlling the electrical connection and electrical disconnection of the energy storage unit from the first node, the control system being configured to:
control the power converter to adjust the magnitude of the output voltage at the first node to a magnitude of an energy storage unit voltage;
determining whether adjusting the magnitude of the output voltage at the first node to the magnitude of the energy storage unit voltage causes power output of the power converter to exceed the power converter's limits;
in response to determining that adjusting the magnitude of the voltage at the first node to the magnitude of the energy storage unit voltage will not cause power output of the power converter to exceed the power converter's limits:
closing the main switch to electrically connect the energy storage unit to the first node once the magnitude of the voltage at the first node matches the magnitude of the energy storage unit voltage;
in response to determining that adjusting the magnitude of the voltage at the first node to the magnitude of the energy storage unit voltage will cause power output of the power converter to exceed the power converter's limits:
electrically connecting the break path to the first node for diverting power away from the first node;
adjusting the magnitude of the voltage at the first node to match the magnitude of the energy storage unit voltage; and
once the magnitude of the voltage at the first node is adjusted to match the magnitude of the energy storage unit voltage, electrically connecting the energy storage unit to the first node and electrically disconnecting the break path from the first node.

2. The energy storage system of claim 1, wherein the control system being configured to control the power converter to adjust the magnitude of the output voltage to a magnitude of the energy storage unit voltage and control the main switch to electrically connect the energy storage unit to the first node includes the control system being configured to:
electrically connect the break path to the first node;
control the power converter to adjust the magnitude of the output voltage at the first node to the magnitude of the energy storage unit voltage;
once the magnitude of the output voltage at the first node is adjusted to the magnitude of the energy storage unit voltage, electrically connect the energy storage unit to the first node and electrically disconnect the break path from the first node.

3. The energy storage system of claim 1, wherein the control system being configured to electrically disconnect the energy storage unit from the first node includes the control system being configured to:
in response to determining the energy storage unit is discharging via the main switch:
control the power converter to reduce a discharge power from the energy storage unit;
control the main switch to open to electrically disconnect the energy storage unit from the first node while the discharge power is reduced; and
control the power converter to operate in maximum power point tracking (MPPT) mode after the energy storage unit is disconnected;
in response to determining the energy storage unit is charging via the main switch:
control the power converter to reduce a charge power to the energy storage unit;
control the main switch to open to electrically disconnect the energy storage unit from the first node while the charge power is reduced; and
control the power converter to operate in maximum power point tracking (MPPT) mode after the energy storage unit is disconnected.

4. The energy storage system of claim 3, wherein the control system being configured to electrically disconnect the energy storage unit from the first node further includes the control system being configured to:
when the energy storage unit is charging:
electrically connect the break path to the first node prior to opening the main switch; and
electrically disconnect the break path after opening the main switch.

5. The energy storage system of claim 1, wherein the break path is formed between the first node and across the energy source.

6. The energy storage system of claim 5, wherein the break path comprises a break switch and a break resistor connected in series between the first node and across the energy source.

7. The energy storage system of claim 6, wherein the control system being configured to control the power converter to adjust the magnitude of the output voltage to a magnitude of the energy storage unit voltage and control the main switch to electrically connect the energy storage unit to the first node includes the control system being configured to:
control the break switch to electrically connect the break path to the first node;
control the power converter to adjust the magnitude of the output voltage at the first node to the magnitude of the energy storage unit voltage; and
once the magnitude of the output voltage at the first node is adjusted to the magnitude of the energy storage unit voltage, control the main switch to electrically connect the energy storage unit to the first node and open the break switch to electrically disconnect the break path from the first node.

8. The energy storage system of claim 6, wherein the main switch comprises a first main switch and a second main switch connected in series between the first node and the energy storage unit, wherein:
the first main switch is a power electronics switch that when turned off prevents power from flowing from the first node to the energy storage unit and when turned on allows power to flow; and
the second main switch is a power electronics switch that when turned off prevents power from flowing from the energy storage unit to the first node and when turned on allows power to flow,
wherein the control system being configured to control the power converter to adjust the magnitude of the output voltage to a magnitude of the energy storage unit voltage and control the main switch to electrically connect the energy storage unit to the first node includes the control system being configured to:
control the break switch to electrically connect the break path to the first node;

control the power converter to adjust the magnitude of the output voltage at the first node to the magnitude of the energy storage unit voltage;
control the first main switch to turn on such that power can flow into the energy storage unit but not from the energy storage unit;
control the break switch to electrically disconnect the break path from the first node; and
control the second main switch to turn on such that power can flow bi-directionally.

9. The energy storage system of claim 6, wherein the main switch comprises a first main switch and a second main switch connected in series between the first node and the energy storage unit, wherein:
the first main switch is a power electronics switch that when turned off prevents power from flowing from the first node to the energy storage unit and when turned on allows power to flow in both directions; and
the second main switch is a power electronics switch that when turned off prevents power from flowing from the energy storage unit to the first node and when turned on allows power to flow in both directions,
wherein the control system being configured to electrically disconnect the energy storage unit from the first node includes the control system being configured to:
when the energy storage unit is discharging:
control the power converter to reduce the discharge power from the energy storage unit;
control the first main switch to open;
control the second main switch to open such that the energy storage unit is electrically disconnected from the first node;
when the energy storage unit is charging:
control the power converter to reduce a charge power of the energy storage unit,
control the second main switch to open such that power cannot flow from the energy storage unit to the first node;
control the break switch to electrically connect the break path to the first node;
control the first main switch to open such that the energy storage unit is electrically disconnected from the first node and control the break switch to electrically disconnect the break path from the first node; and
control the power converter to operate in MPPT mode.

10. The energy storage system of claim 1, wherein the break path is formed between the first node and a second node, the second node being an electrical connection point between the main switch and the energy storage unit.

11. The energy storage system of claim 10, wherein the break path comprises a break resistor and a break switch connected in series between the first node and the second node.

12. The energy storage system of claim 11, wherein the control system being configured to control the power converter to adjust the magnitude of the output voltage to a magnitude of the energy storage unit voltage and control the main switch to electrically connect the energy storage unit to the first node includes the control system being configured to:
control the break switch to electrically connect the break path to the first node; and
control the main switch to electrically connect the energy storage unit to the first node and open the break switch to electrically disconnect the break path from the first node.

13. The energy storage system of claim 11, wherein the main switch comprises a first main switch and a second main switch connected in series between the first node and the second node, wherein:
the first main switch is a power electronics switch that when turned off prevents power from flowing from the first node to the energy storage unit and when turned on allows power to flow; and
the second main switch is a power electronics switch that when turned off prevents power from flowing from the energy storage unit to the first node and when turned on allows power to flow,
wherein the control system being configured to control the power converter to adjust the magnitude of the output voltage to a magnitude of the energy storage unit voltage and control the main switch to electrically connect the energy storage unit to the first node includes the control system being configured to:
control the break switch to electrically connect the break path to the first node;
control the first main switch and the second main switch to turn on such that power can flow bi-directionally;
control the break switch to electrically disconnect the break path from the first node.

14. The energy storage system of claim 11, wherein the main switch comprises a first main switch and a second main switch connected in series between the first node and the energy storage unit, wherein:
the first main switch is a power electronics switch that when turned off prevents power from flowing from the first node to the energy storage unit and when turned on allows power to flow; and
the second main switch is a power electronics switch that when turned off prevents power from flowing from the energy storage unit to the first node and when turned on allows power to flow,
wherein the control system being configured to electrically disconnect the energy storage unit from the first node includes the control system being configured to:
in response to determining the energy storage unit is discharging via the main switch:
control the power converter so as to reduce the discharge power from the energy storage unit;
control the first main switch to open while the discharge power is reduced; and
control the second main switch to open such that the energy storage unit is electrically disconnected from the first node;
in response to determining the energy storage unit is charging via the main switch:
control the power converter to reduce a charge power to the energy storage unit;
control the second main switch to open such that power cannot flow from the energy storage unit to the first node while the charge power is reduced;
control the first main switch to open such that the energy storage unit is electrically disconnected from the first node; and
control the power converter to operate in MPPT mode.

15. The energy storage system of claim 1, wherein the main switch comprises a first main switch and a second main switch connected in series between the first node and the energy storage unit, wherein:
the first main switch is a power electronics switch that when turned off prevents power from flowing from the first node to the energy storage unit and when turned on allows power to flow; and the second main switch is a power electronics switch that when turned off prevents power from flowing from the energy storage unit to the first node and when turned on allows power to flow.

16. The energy storage system of claim 1, wherein the energy storage unit is a battery.

17. The energy storage system of claim 1, wherein the power source is a photovoltaic (PV) array.

18. A method of electrically connecting an energy storage unit to a power source in an energy storage system comprising the energy storage unit direct DC coupled to the power source at a first node through a main switch, and a power converter electrically connected to the first node and capable of adjusting a magnitude of a voltage at the first node, the method comprising:
    attempting to adjust the magnitude of the voltage at the first node to a magnitude of an energy storage unit voltage by controlling the power converter; and
    closing the main switch to electrically connect the energy storage unit to the first node,
    wherein the attempting to adjust the magnitude of the voltage at the first node to a magnitude of an energy storage unit voltage and the closing the main switch to electrically connect the energy storage unit to the first node comprises:
    determining whether adjusting the magnitude of the voltage at the first node to the magnitude of the energy storage unit voltage will cause power output of the power converter to exceed the power converter's limits; and
        in response to determining that adjusting the magnitude of the voltage at the first node to the magnitude of the energy storage unit voltage will not cause power output of the power converter to exceed the power converter's limits:
            closing the main switch to electrically connect the energy storage unit to the first node once the magnitude of the voltage at the first node matches the magnitude of the energy storage unit voltage;
        in response to determining that adjusting the magnitude of the voltage at the first node to the magnitude of the energy storage unit voltage will cause power output of the power converter to exceed the power converter's limits:
            electrically connecting a break path to the first node for diverting power away from the first node;
            adjusting the magnitude of the voltage at the first node to match the magnitude of the energy storage unit voltage; and
            once the magnitude of the voltage at the first node is adjusted to match the magnitude of the energy storage unit voltage, electrically connecting the energy storage unit to the first node and electrically disconnecting the break path from the first node.

19. The method of claim 18, wherein attempting to adjust the magnitude of the voltage at the first node to a magnitude of an energy storage unit voltage and closing the main switch to electrically connect the energy storage unit to the first node further comprises:
    electrically connecting a pre-charge break path comprising a pre-charge switch and a pre-charge resistor connected in series between the first node and a second node, the second node being an electrical connection point between the main switch and the energy storage unit, by closing the pre-charge switch;
    closing the main switch to directly electrically connect the energy storage unit to the first node; and
    opening the break switch to electrically disconnect the pre-charge break path.

20. The method of claim 18, wherein the main switch comprises a first main switch and a second main switch, and attempting to adjust the magnitude of the voltage at the first node to a magnitude of an energy storage unit voltage and closing the main switch to electrically connect the energy storage unit to the first node further comprises:
    when adjusting the magnitude of the voltage at the first node to the magnitude of the energy storage unit voltage will cause power to exceed the power converter's limits:
    electrically connecting the break path to the first node for diverting power away from the first node;
    adjusting the magnitude of the voltage at the first node to the magnitude of the energy storage unit voltage;
    turning on the first main switch such that power can flow into the energy storage unit but not from the energy storage unit;
    electrically disconnecting the break path from the first node; and
    turning on the second main switch such that power can flow bi-directionally.

21. A method of electrically disconnecting an energy storage unit from a power source in an energy storage system comprising the energy storage unit direct DC coupled to the power source at a first node through a main switch and a power converter electrically connected to the first node and capable of adjusting a magnitude of a voltage at the first node, the method comprising:
    determining whether adjusting the magnitude of the voltage at the first node to the magnitude of the energy storage unit voltage causes power output of the power converter to exceed the power converter's limits;
        in response to determining that adjusting the magnitude of the voltage at the first node to the magnitude of the energy storage unit voltage will not cause power output of the power converter to exceed the power converter's limits:
            closing the main switch to electrically connect the energy storage unit to the first node once the magnitude of the voltage at the first node matches the magnitude of the energy storage unit voltage;
    determining whether the energy storage unit is discharging or charging via the main switch;
    in response to determining the energy storage unit is discharging via the main switch:
    controlling the power converter to reduce a discharge power from the energy storage unit;
    opening the main switch to electrically disconnect the energy storage unit from the first node while the discharge power is reduced; and
    controlling the power converter to operate in maximum power point tracking (MPPT) mode after the energy storage unit is disconnected;
    in response to determining the energy storage unit is charging via the main switch:
    controlling the power converter to reduce a charge power of the energy storage unit;
    opening the main switch to electrically disconnect the energy storage unit from the first node while the charge power is reduced; and
    controlling the power converter to operate in maximum power point tracking (MPPT) mode after the energy storage unit is disconnected.

22. The method of claim 21, further comprising:
when the energy storage unit is charging:
electrically connecting a break path to the first node prior to opening the main switch to divert power away from the first node; and
electrically disconnecting the break path after opening the main switch.

23. The method of claim 22, wherein the main switch comprises a first main switch and a second main switch, and opening the main switch to electrically disconnect the energy storage unit from the first node comprises:
prior to electrically connecting the break path, opening the second main switch such that power cannot flow from the energy storage unit to the first node; and
after electrically connecting the break path, opening the first main switch to electrically disconnect the energy storage unit from the first node.

24. A power converter for coupling with a power source at a first node and for controlling electrical connection and disconnection of an energy storage unit that is direct DC coupled to the first node through a main switch, the power converter comprising:
a power inverter for converting DC to AC, the power converter having a DC input port coupled to the first node and an AC output port coupled to a bus;
a control system for controlling the electrical connection and electrical disconnection of the energy storage unit from the first node, the control system being configured to:
control the power inverter to adjust the magnitude of the output voltage of the power source at the first node to a magnitude of the energy storage unit voltage;
control the electrical connection and the electrical disconnection of the energy storage unit with the first node;
determine whether adjusting the magnitude of the output voltage at the first node to the magnitude of the energy storage unit voltage causes power output of the power converter to exceed the power converter's limits;
in response to determining that adjusting the magnitude of the voltage at the first node to the magnitude of the energy storage unit voltage will not cause power output of the power converter to exceed the power converter's limits:
closing the main switch to electrically connect the energy storage unit to the first node once the magnitude of the voltage at the first node matches the magnitude of the energy storage unit voltage;
in response to determining that adjusting the magnitude of the voltage at the first node to the magnitude of the energy storage unit voltage will cause power output of the power converter to exceed the power converter's limits:
electrically connecting a break path to the first node for diverting power away from the first node;
adjusting the magnitude of the voltage at the first node to match the magnitude of the energy storage unit voltage; and
once the magnitude of the voltage at the first node is adjusted to match the magnitude of the energy storage unit voltage, electrically connecting the energy storage unit to the first node and electrically disconnecting the break path from the first node.

25. The power converter of claim 24, wherein the control system being configured to control the power inverter to adjust the magnitude of the output voltage to a magnitude of the energy storage unit voltage and control the electrical connection of the energy storage unit to the first node includes the control system being configured to:
electrically connect the break path to the first node for diverting power away from the first node;
control the power inverter to adjust the magnitude of the output voltage at the first node to the magnitude of the energy storage unit voltage;
once the magnitude of the output voltage at the first node is adjusted to the magnitude of the energy storage unit voltage, electrically connect the energy storage unit to the first node and electrically disconnect the break path from the first node.

26. The power converter of claim 24, wherein the control system being configured to electrically disconnect the energy storage unit from the first node includes the control system being configured to:
when the energy storage unit is discharging:
control the power inverter to reduce a discharge power of the energy storage unit;
electrically disconnect the energy storage unit from the first node; and
control the power inverter to operate in maximum power point tracking (MPPT) mode;
when the energy storage unit is charging:
control the power inverter to reduce a charge power of the energy storage unit;
electrically disconnect the energy storage unit from the first node; and
control the power inverter to operate in maximum power point tracking (MPPT) mode.

27. The power converter of claim 26, wherein the control system being configured to electrically disconnect the energy storage unit from the first node further includes the control system being configured to:
when the energy storage unit is charging:
electrically connect the break path to the first node prior to electrically disconnecting the energy storage unit to divert power away from the first node;
electrically disconnect the energy storage unit; and
electrically disconnect the break path.

* * * * *